United States Patent

Aoyama et al.

Patent Number: 6,026,921
Date of Patent: Feb. 22, 2000

[54] HYBRID VEHICLE EMPLOYING PARALLEL HYBRID SYSTEM, USING BOTH INTERNAL COMBUSTION ENGINE AND ELECTRIC MOTOR FOR PROPULSION

[75] Inventors: Shunichi Aoyama, Kanagawa; Shinichiro Kitada, Tokyo; Noboru Hattori, Kanagawa; Isaya Matsuo, Tokyo, all of Japan

[73] Assignee: Nissan Motor Co., Ltd, Yokohama, Japan

[21] Appl. No.: 09/271,326

[22] Filed: Mar. 18, 1999

[30] Foreign Application Priority Data

Mar. 20, 1998 [JP] Japan .................................. 10-072388

[51] Int. Cl.⁷ ...................................... B60K 6/02
[52] U.S. Cl. ...................... 180/65.2; 123/348; 180/65.4; 180/65.8; 701/22
[58] Field of Search ............................. 701/22, 105, 113; 318/8; 123/347, 348; 180/65.1, 65.2, 65.3, 65.4, 65.8

[56] References Cited

U.S. PATENT DOCUMENTS

| | | | |
|---|---|---|---|
| 4,335,429 | 6/1982 | Kawakatsu | 701/22 X |
| 5,624,347 | 4/1997 | Yang | 180/65.2 X |
| 5,697,466 | 12/1997 | Moroto et al. | 701/22 X |
| 5,823,280 | 10/1998 | Lateur et al. | 180/65.2 |
| 5,823,282 | 10/1998 | Yamaguchi | 180/65.2 |
| 5,826,671 | 10/1998 | Nakae et al. | 180/65.2 |
| 5,845,731 | 12/1998 | Buglione et al. | 180/65.2 |
| 5,865,263 | 2/1999 | Yamaguchi et al. | 180/65.2 |

FOREIGN PATENT DOCUMENTS 5-50865  3/1993  Japan .

*Primary Examiner*—Michael Mar
*Attorney, Agent, or Firm*—Foley & Lardner

[57] ABSTRACT

A hybrid vehicle employing a parallel hybrid system, using both an internal combustion engine and an electric motor for propulsion, comprises a propulsion mechanism having at least a first electric motor, an internal combustion engine, a clutch, a second electric motor, a transmission, and drive wheels, and constructed so that a crankshaft of the engine and a motor shaft of the first electric motor are connected to an input shaft of the clutch, and that a motor shaft of the second electric motor and an input shaft of the transmission are connected to an output shaft of the clutch to transmit a driving torque from the output shaft of the transmission to the drive wheels. An engine temperature sensor is provided for detecting an engine temperature. An electronic control unit is connected to the propulsion mechanism and the engine temperature sensor, for disengaging the clutch and stopping the engine during a standstill state of the hybrid vehicle, and for propelling the hybrid vehicle by a driving torque generated by the second electric motor when the hybrid vehicle starts, and for starting up the engine by the first electric motor and engaging the clutch after engine startup, during the warm-up of the engine. A variable valve timing control system is electrically connected to the control unit for adjusting an intake-valve closure timing to a predetermined retarded closure timing when the clutch is disengaged and for adjusting the intake-valve closure timing to a predetermined advanced closure timing after the clutch is engaged, after the engine warm-up.

6 Claims, 12 Drawing Sheets

DURING DRIVING OF VEHICLE PROPELLED BY MOTOR AFTER WARM-UP, WHILE THE ENGINE IS NOT STARTED UP AND THE CLUTCH IS DISENGAGED.

DURING DRIVING OF VEHICLE PROPELLED BY ENGINE AFTER WARM-UP, WHILE THE CLUTCH IS ENGAGED.

DURING DRIVING OF VEHICLE PROPELLED BY MOTOR/ENGINE DURING COLD ENGINE OPERATION, WHILE THE CLUTCH IS DISENGAGED OR ENGAGED.

HYBRID VEHICLE EMPLOYING PARALLEL HYBRID SYSTEM, USING BOTH INTERNAL COMBUSTION ENGINE AND ELECTRIC MOTOR FOR PROPULSION

BACKGROUND OF THE INVENTION

1. Field of the Invention

The present invention relates to a hybrid vehicle employing a parallel hybrid system, using both an internal combustion engine and an electric motor/generator as a propelling power source, and specifically to a driving torque control system for a hybrid vehicle with a parallel hybrid system.

2. Description of the Prior Art

As is generally known, later model passenger cars often employ a variable valve timing/lift control system to improve engine power output, for example, at low- and mid-speed range, and to improve fuel economy, and to reduce exhaust emissions. Generally, the variable valve timing control system is used to control an intake valve closing point or an intake valve close timing (herebelow abbreviated to "IVC") depending on engine speed and/or engine load. In recent years, there have been proposed and developed various parallel hybrid vehicles propelled by an internal combustion engine and/or an electric motor. The internal combustion engine of such a hybrid vehicle often adopts the previously-noted variable valve timing control system for altering the intake valve timing. One such parallel hybrid vehicle has been disclosed in Japanese Patent Provisional Publication No. 5-50865. In this type of parallel hybrid vehicles as disclosed in the Japanese Patent Provisional Publication No.5-50865, the output shaft of the engine is connected through a clutch to a motor shaft of an electric motor, to transmit driving torque through the motor shaft via a differential to drive wheels. In order to reduce fuel consumption, the parallel hybrid system executes a so-called idling stop where the engine is stopped during the vehicle standstill. The hybrid vehicle normally moves off on electric power of the electric motor. After the engine is started up, the hybrid vehicle is propelled by driving torque generated by the engine with the clutch engaged.

SUMMARY OF THE INVENTION

However, just after the engine is started up, there is a less development of negative pressure in the intake manifold, and thus positive and negative torque fluctuations are great. As a consequence, when the clutch is engaged just after the engine startup, such undesirable torque fluctuations could be transmitted to the drive wheels. This results in powertrain vibrations in the longitudinal directions of the vehicle, thereby deteriorating a comfortable ride.

Accordingly, it is an object of the invention to provide a hybrid vehicle employing a parallel hybrid system which avoids the aforementioned disadvantages of the prior art.

It is another object of the invention to provide a hybrid vehicle employing a parallel hybrid system, using both an internal combustion engine and an electric motor for propulsion, which is capable of minimizing torque fluctuations of the engine when switching from a motor-propelled vehicle driving mode to an engine-propelled vehicle driving mode.

In order to accomplish the aforementioned and other objects of the present invention, a hybrid vehicle employing a parallel hybrid system, using both an internal combustion engine and an electric motor for propulsion, said hybrid vehicle comprises a propulsion mechanism having at least a first electric motor, an internal combustion engine, a clutch, a second electric motor, a transmission, and drive wheels, and constructed so that a crankshaft of the engine and a motor shaft of the first electric motor are connected to an input shaft of the clutch, and that a motor shaft of the second electric motor and an input shaft of the transmission are connected to an output shaft of the clutch to transmit a driving torque from the output shaft of the transmission to the drive wheels, an engine temperature sensor for detecting an engine temperature of the engine, a control unit being configured to be electrically connected to the propulsion mechanism and the engine temperature sensor, for disengaging the clutch and stopping the engine during a standstill state of the hybrid vehicle, and for starting the hybrid vehicle by a driving torque generated by the second electric motor when the hybrid vehicle starts, and for starting up the engine by the first electric motor and engaging the clutch after engine startup, under a first specified engine-temperature condition where the engine temperature is above a predetermined temperature value, and a variable valve timing control system electrically connected to the control unit for adjusting an intake-valve closure timing to a predetermined retarded closure timing when the clutch is disengaged and for adjusting the intake-valve closure timing to a predetermined advanced closure timing after the clutch is engaged, under the first specified engine-temperature condition.

According to another aspect of the invention, an electronic driving torque control system for a hybrid vehicle employing a parallel hybrid system, using both an internal combustion engine and an electric motor for propulsion, the internal combustion engine having a variable valve timing control system mounted on at least an intake valve for variably adjusting an intake-valve closure timing and an electronic ignition system, the electronic driving torque control system comprises a propulsion means having at least a first electric motor, an internal combustion engine, a clutch, a second electric motor, a transmission, and drive wheels, and constructed so that a crankshaft of the engine and a motor shaft of the first electric motor are connected to an input shaft of the clutch, and that a motor shaft of the second electric motor and an input shaft of the transmission are connected to an output shaft of the clutch to transmit a driving torque from the output shaft of the transmission to the drive wheels, an engine temperature sensor for detecting an engine temperature of the engine, a propulsion control means connected to the propulsion means and the engine temperature sensor, for disengaging the clutch and stopping the engine during a standstill state of the hybrid vehicle, and for starting the hybrid vehicle by a driving torque generated by the second electric motor when the hybrid vehicle starts, and for starting up the engine by the first electric motor and engaging the clutch after engine startup, under a first specified engine-temperature condition where the engine temperature is above a predetermined temperature value, and an intake-valve closure timing control means connected to the variable valve timing control system for controlling an intake-valve closure timing to a predetermined retarded closure timing when the clutch is disengaged and for controlling the intake-valve closure timing to a predetermined advanced closure timing after the clutch is engaged, under the first specified engine-temperature condition. The intake-valve closure timing control means may set the intake-valve closure timing at the predetermined retarded closure timing before the engine is started up and gradually control the intake-valve closure timing to a direction of timing advancement when the clutch is engaged after engine startup, under the first specified engine-temperature condition. Also, the propulsion control means may be configured to be electrically connected to the propulsion means, the engine temperature sensor, and the electronic ignition system, for disengaging the clutch and continuing to run the engine while igniting air-fuel mixture during the standstill state of the hybrid vehicle, and for starting the hybrid vehicle by both a driving torque generated by the engine and the driving torque generated by the second electric motor with the clutch held in a half-engaged state when the hybrid vehicle starts, under a second specified engine-temperature condition where the engine temperature is below the predetermined temperature value, and wherein the intake-valve closure timing control means may control the intake-valve closure timing to a predetermined advanced closure timing irrespective of whether the clutch is engaged or disengaged, under the second specified engine-temperature condition.

According to a still further aspect of the invention, an electronic control method for a hybrid vehicle employing a parallel hybrid system, using both an internal combustion engine and an electric motor for propulsion, the internal combustion engine having a variable valve timing control system mounted on at least an intake valve for variably adjusting an intake-valve closure timing and a driving torque generated by the engine being transmitted to drive wheels via a clutch, the electronic control method comprises comparing an engine temperature with a predetermined temperature value to determine whether the engine is conditioned in a cold-engine state or in a warmed-up engine state, constantly fixing the intake-valve closure timing to a predetermined advanced closure timing irrespective of engagement and disengagement of the clutch, under a first specified engine-temperature condition where the engine temperature is below the predetermined temperature value, and setting the intake-valve closure timing at a predetermined retarded closure timing before the engine is started up and gradually controlling the intake-valve closure timing to a direction of timing advancement when the clutch is engaged after engine startup, and setting the intake-valve timing at a predetermined advanced closure timing when the clutch is engaged, under a second specified engine-temperature condition where the engine temperature is above the predetermined temperature value.

DESCRIPTION OF THE PREFERRED EMBODIMENTS

Figure 1:
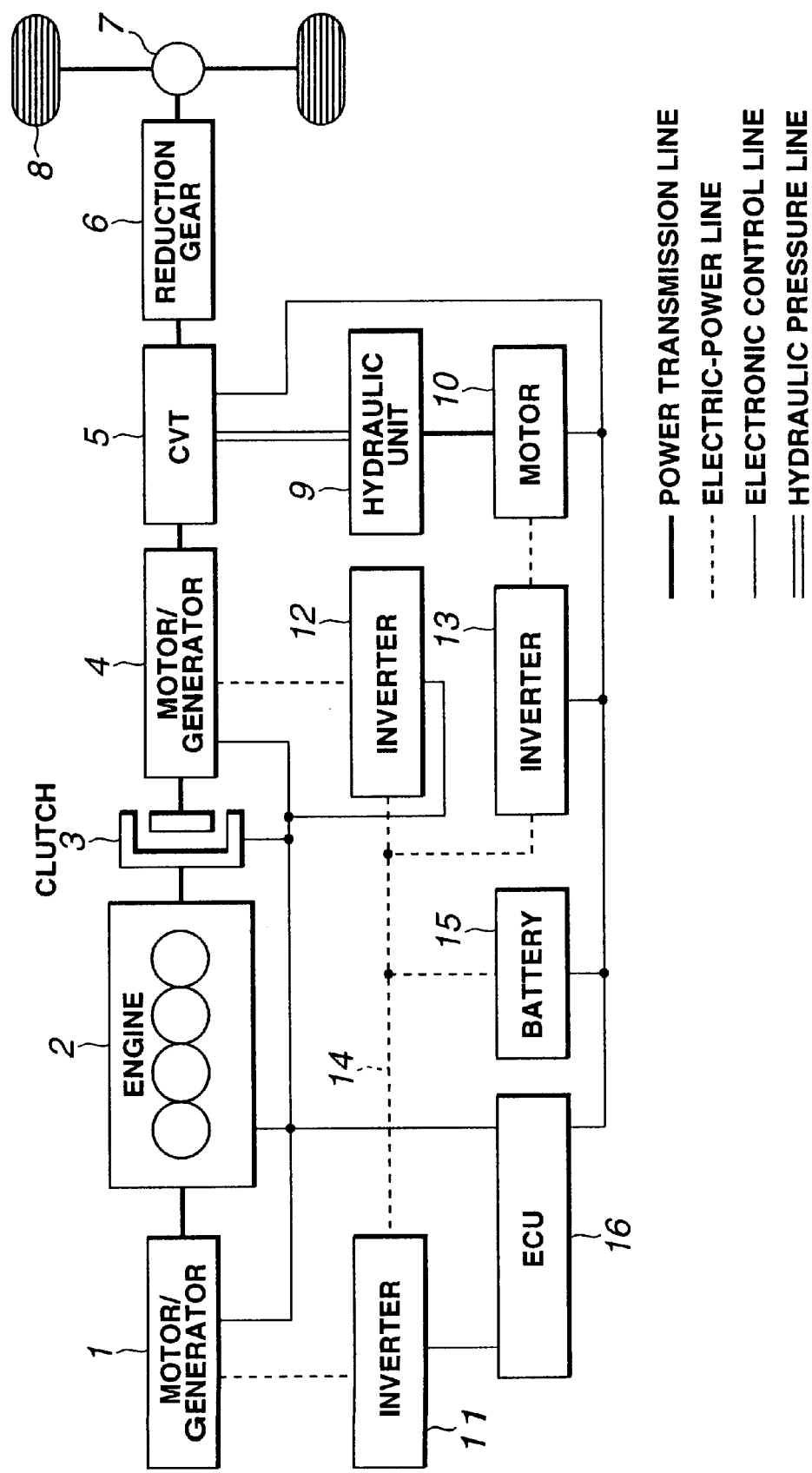
FIG. 1 is a system block diagram illustrating one embodiment of a hybrid vehicle of the invention.
Figure 2:
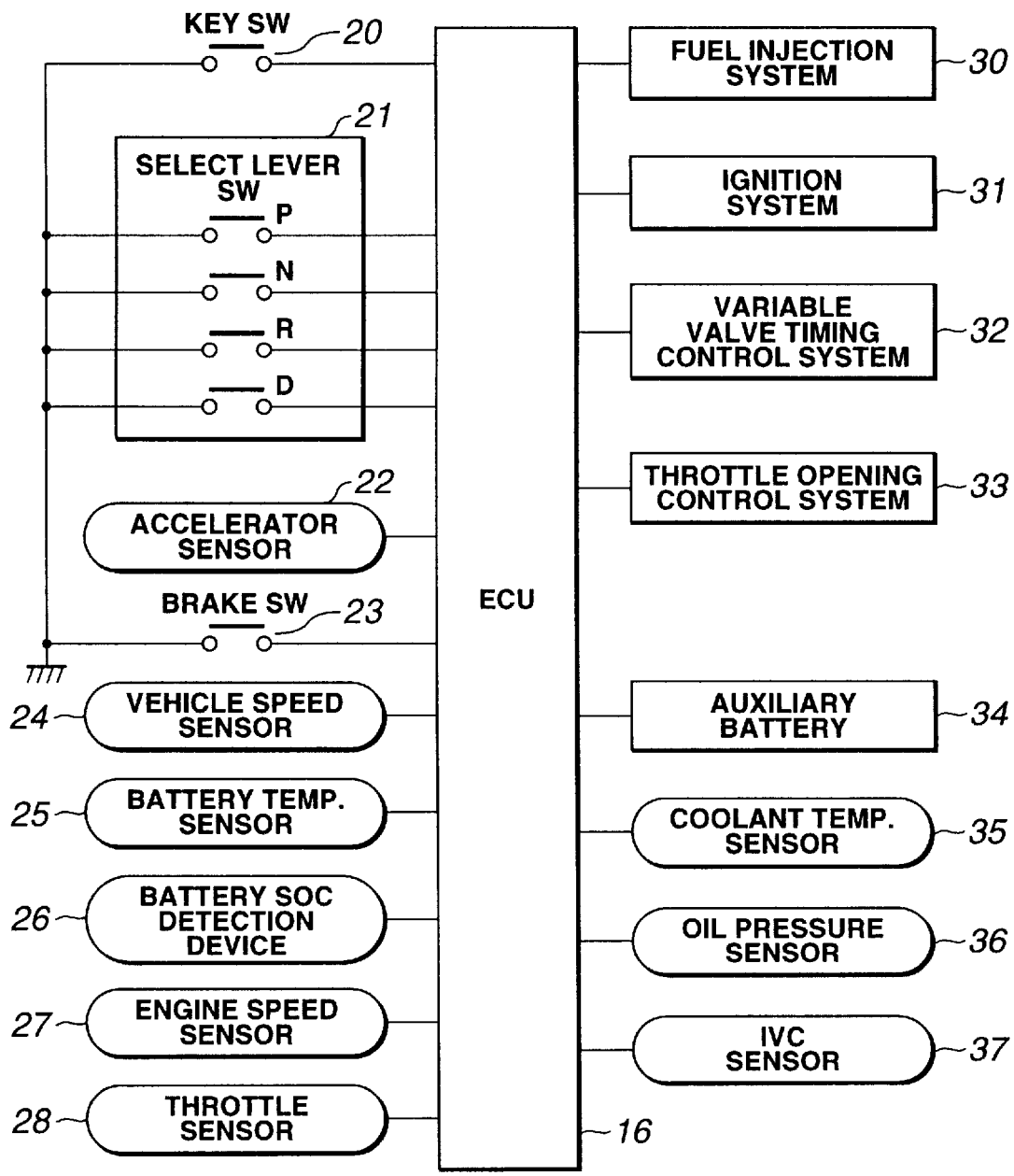
FIG. 2 is a block diagram illustrating a control circuit being applicable to a parallel hybrid system of the hybrid vehicle shown in FIG. 1.

Referring now to the drawings, particularly to FIG. 1, there is shown a system layout of the hybrid vehicle of the embodiment. In FIG. 1, the heavy solid line denotes a power transmission line, the broken line denotes an electric-power line, the fine solid line denotes an electronic control line, and the double line denotes a hydraulic pressure line. The power train of the hydraulic vehicle shown in FIG. 1 is constructed by a motor/generator 1, an internal combustion engine 2, a clutch 3, a motor/generator 4, a continuously variable automatic transmission (often abbreviated to "CVT") 5, a reduction gear 6, a differential gear 7, a pair of axle driveshafts (not numbered), and drive wheels 8. The output shaft of the motor/generator 1, the output shaft of the engine 2, and the input shaft of the clutch 3 are connected to each other. The output shaft of the clutch 3, the output shaft of the motor/generator 4, and the input shaft of the CVT 5 are connected to each other. As seen in FIG. 1, when the clutch 3 is engaged, a driving torque generated by the engine 2 and a driving torque generated by the motor/generator 4 are both transmitted through the CVT 5, the reduction gear 6, and the differential 7 to the drive wheels 8. That is to say, with the clutch 3 engaged, the engine 2 and the motor/generator 4 both serve as a propelling power source for the hybrid vehicle. To the contrary, when the clutch 3 is disengaged, only the driving torque generated by the motor/generator 4 is transmitted through the CVT, the reduction gear 6, and the differential 7 to the drive wheels 8. With the clutch 3 disengaged, only the motor/generator 4 serves as a propelling power source for the vehicle. In FIG. 1, the CVT 5 is comprised of a belt type continuously variable automatic transmission (see FIGS. 3 and 4.), a toroidal type continuously variable automatic transmission (see FIG. 5), or the like. The hydraulic unit 9 is fluidly connected to the CVT 5 to supply pressurized oil (properly regulated hydraulic pressure) to the CVT 5, in order for the speed-change ratio of the CVT to be steplessly variable and for lubrication. If the CVT 5 comprises a belt type CVT, two sorts of regulated hydraulic pressures produced by the hydraulic unit 9 are respectively fed into a driving-pulley (a primary-pulley) actuation hydraulic actuator and a driven-pulley (a secondary-pulley actuation hydraulic actuator for continuously changing effective diameters of the primary and secondary-driving and driven-pulleys. If the CVT 5 comprises a toroidal CVT, the hydraulic unit 9 produces the regulated hydraulic pressure to continuously change both the high contact-pressure point between an input disc and a power roller and the high contact-pressure point between an output disc and the power roller, so that traction oil transmits power using its shearing force at high contact pressure. As a hydraulic pressure source, the hydraulic unit 9 has an oil pump (not shown). The oil pump of the hydraulic unit 9 is driven by means of a motor 10. Each of the motor/generator 1 and the motor/generator 4 is comprised of an alternating current electric motor/generator (a.c. motor/generator) such as a three-phase synchronous motor/generator, a three-phase induction motor/generator, or the like. The motor 10 is comprised of an alternating current electric motor (a.c. motor) such as a three-phase synchronous motor, a three-phase induction motor, or the like. The motor/generator 1 serves mainly to start up the engine 2 and to generate electricity (electric energy). The motor/generator 4 serves mainly as a propulsion motor and as a regenerative braking device. On the other hand, the motor 10 serves to drive the oil pump of the hydraulic unit 9. In the shown embodiment, each of the motor/generator 1 and the motor/generator 4 comprises an a.c. motor/generator, whereas the motor 10 comprises an a.c. electric motor. Alternatively, each of the motor/generator 1 and the motor/generator 4 may comprise a d.c. electric motor/generator, whereas the motor 10 may comprise a d.c. electric motor. Furthermore, when the clutch 3 is engaged, the motor/generator 1 may be used as a propulsion motor and a regenerative braking device, whereas the motor/generator 4 may be used as an engine start-up motor as well as a generator. In the shown embodiment, the clutch 3 comprises a powder clutch which is capable of adjusting the magnitude of torque transmitted therethrough. In lieu of the use of a powder clutch, a dry single disc clutch or a wet multiple disc clutch may be used. Electric energy is supplied via an inverter 11 to the a.c. motor/generator 1, and also supplied via an inverter 12 to the a.c. motor/generator 4. In the same manner, electric energy is supplied via an inverter 13 to the a.c. motor 10. If each of the motor/generator 1 and the motor/generator 4 comprises a d.c. motor/generator and the motor 10 comprises a d.c. motor, a dc to dc converter is used in lieu of a dc to ac inverter (11, 12, 13). The inverters 11, 12, and 13 are electrically connected to the main battery 15 via a common DC link 14. In the embodiment, d.c. electric power stored in the main battery 15 is inverted into a.c. electric power via the inverters 11, 12, and 13, and then the a.c. electric power is supplied via the common DC link 14 to the motor/generators 1 and 4 and to the motor 10. The inverters 11 and 12 associated with the respective motor/generators 1 and 4 also serve to convert a.c. electric power generated by the motor/generators 1 and 4 to d.c. electric power so as to recharge the main battery 15. The use of the common DC link 14 enables one of the motor/generators, when in a regenerative running state, to directly supply electric power to the motor 10 or to the other motor/generator in a power running state. In this case, the electric power is not supplied from the main battery 15. A lithium-ion battery, a nickel-hydride battery, a lead-acid storage battery or the like, or an electrical double layer capacitor unit, often called "power capacitor unit" can be used as the main battery. The electronic control unit (ECU) or the controller 16 is provided for electronically controlling the parallel hybrid system of the embodiment. The control unit 16 comprises a microcomputer, peripheral parts of the microcomputer, and various kinds of actuators, for controlling engine speed and torque output of the engine 2, the magnitude of torque transmitted through the clutch 3, a rotational speed of each of the motor/generators 1 and 4 and the motor 10, the magnitude of torque generated by each of the motor/generators 1 and 4, and the motor 10, and a transmission ratio (or a speed-change ratio) of the CVT 5. As seen in FIG. 2, the input interface of the control unit 16 is connected to a key switch 20, a select lever switch 21, an accelerator sensor 22, a brake switch 23, a vehicle speed sensor 24, a battery temperature sensor 25, a battery state-of-charge (SOC) detection device 26, an engine speed sensor 27, and a throttle sensor 28 to receive various engine/vehicle sensor signals and switch signals from the switches and the sensors. The key switch 20 is closed when an ignition key of the vehicle is held at an ON position or at a START position. Therefore, the control unit 16 can determine turned-ON or turned-OFF states depending on an ON signal or an OFF signal from the key switch 20. The select lever 21 generates a signal indicative of an operating range selected from a parking range (P), a neutral range (N), a reverse range (R), and a drive range (D). The accelerator sensor 22 detects the degree of depression of the accelerator, i.e., the accelerator opening $\theta$ (or an accelerator operating amount APS of the accelerator pedal). The brake switch 23 detects the presence or absence of depression of the brake pedal. When the brakes are applied with depression of the brake pedal, the brake switch is turned ON, and thus the ON signal from the brake switch is sent to the input interface of the control unit (ECU). The vehicle speed sensor 24 is provided to detect a vehicle speed V. Usually, the vehicle speed sensor 24 corresponds to a CVT output-shaft rotational speed sensor. The battery temperature sensor 25 is provided to detect a battery temperature Tb of the main battery 15. The battery SOC detection device 26 is provided to detect a state of charge (or a charging rate) of the main battery 15. The engine speed sensor 27 is provided to detect engine speed of the engine 2. The throttle sensor 28 is provided to detect a throttle opening $\theta$th of the engine 2. The output interface of the control unit 16 is connected to an electronic fuel injection system 30, an electronic ignition system 31, a variable valve timing control system (or a variable valve timing/lift control system) 32, and a throttle opening control system 33. An auxiliary battery 34 is connected to the control unit 16 to supply electric power to the control unit 16. The input interface of the control unit 16 is also connected to an engine temperature sensor (such as a coolant temperature sensor 35), an oil pressure sensor 36, and an intake valve close timing sensor (simply an IVC sensor) 37. The control unit 16 electronically controls the electronic fuel injection system 30 and consequently controls fuel supply, fuel cutoff, and an actual fuel-injection amount. An ignition timing is determined on the basis of both the engine speed Ne detected by the engine speed sensor 27 and the engine load estimated from an accelerator opening θ detected by the accelerator sensor 22. The control unit 16 controls the variable valve timing control system 32 to variably adjust a valve close timing of the intake valve of the engine 2, as will be fully described later. The control unit 16 also controls the throttle opening control system 33 to adjust the throttle opening θth of the engine 2. Each fuel injector of the engine 2 is controlled depending on the fuel injection amount determined, whereas a spark plug of each engine cylinder is fired depending on the ignition timing determined. The throttle opening control system 33 comprises an electronically-controlled throttle. The electronically-controlled throttle is disposed in an intake-air passage of an induction system and is not mechanically linked to the accelerator pedal, for electronically controlling the throttle opening θth regardless of depression of the accelerator pedal. By virtue of the provision of the electronically-controlled throttle, the throttle opening θth can be adjusted independently of the depression amount θ of the accelerator pedal. The coolant temperature sensor 35 is provided to detect an engine coolant temperature Tw. The oil pressure sensor 36 is provided to detect an engine oil pressure Pe. The IVC sensor 37 is provided to detect an intake-valve close timing or an intake-valve closing point (IVC) which is adjustable by means of the variable valve timing control system 32.

Figure 3:
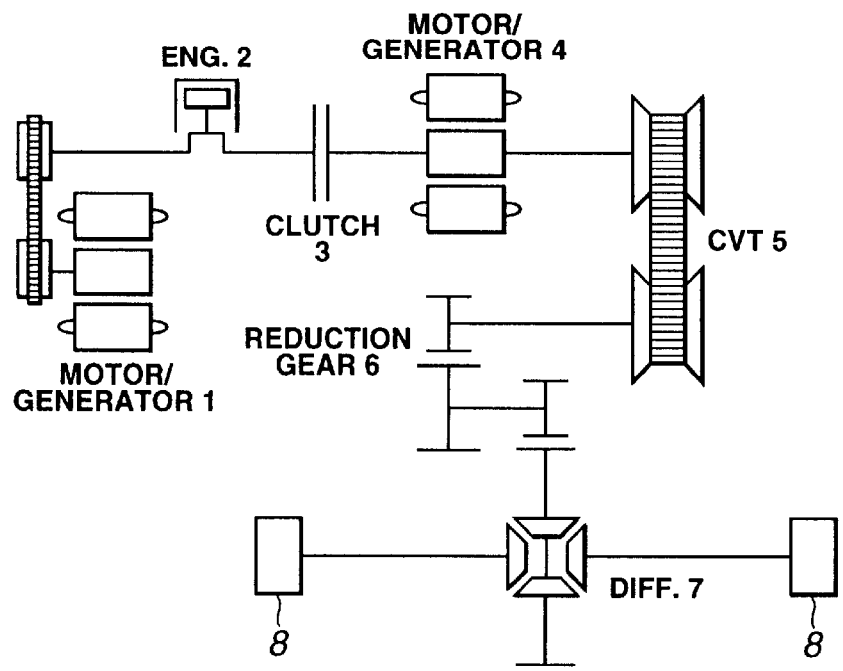
FIG. 3 is a schematic layout illustrating one embodiment of a power train being applicable to the hybrid vehicle shown in FIG. 1.
Figure 4:
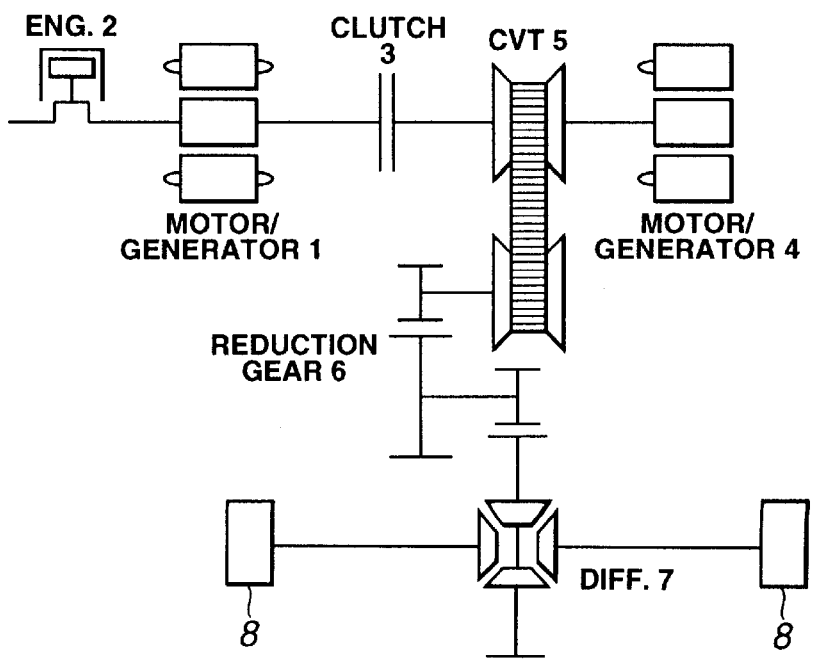
FIG. 4 is a schematic layout illustrating another embodiment of a power train being applicable to the hybrid vehicle shown in FIG. 1.
Figure 5:
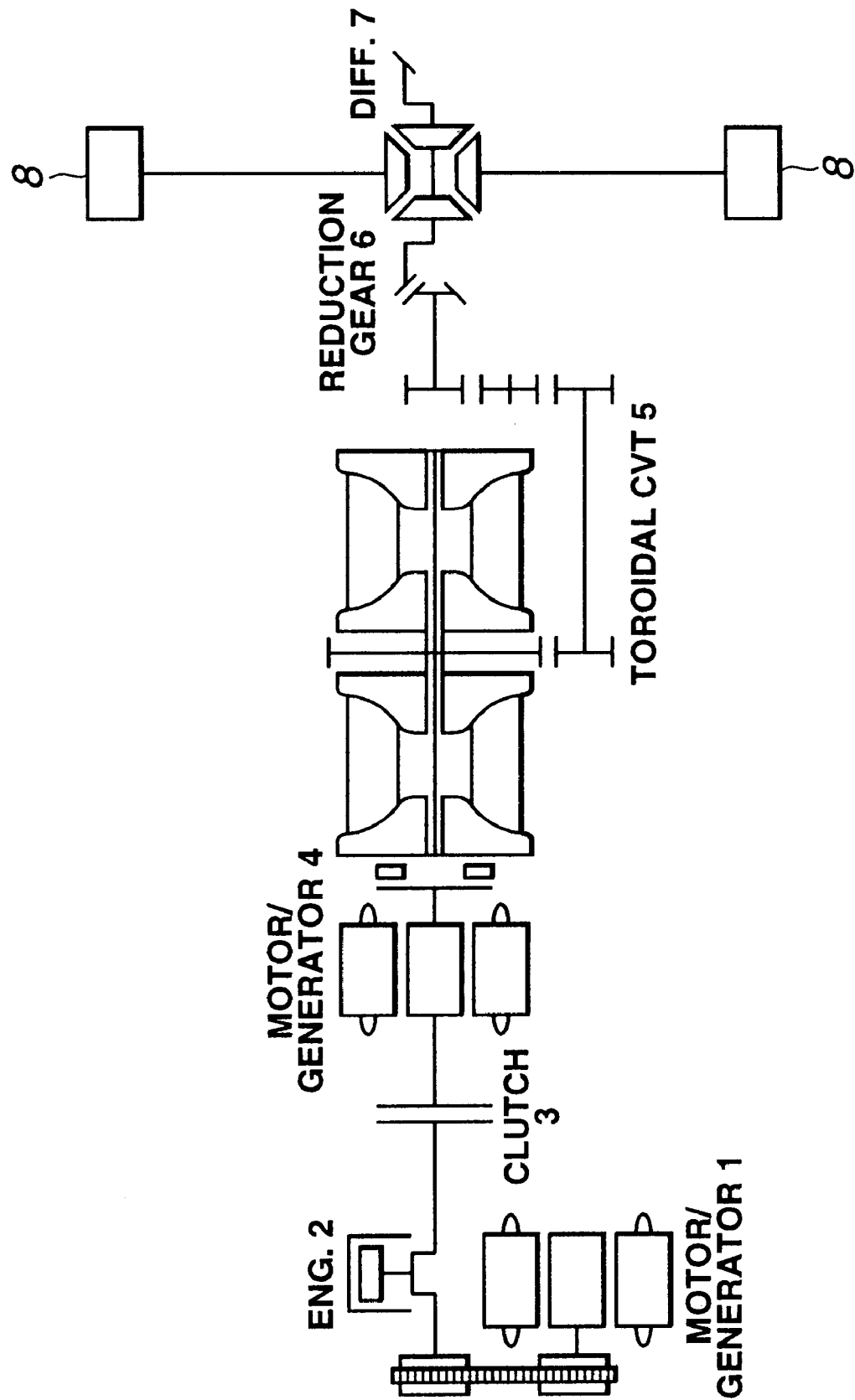
FIG. 5 is a schematic layout illustrating a still further embodiment of a power train being applicable to the hybrid vehicle shown in FIG. 1.

Referring now to FIGS. 3 and 4, there are shown two examples of a powertrain layout applicable to the hybrid vehicle of the invention. As regards the layout between the engine 2 and the motor/generator 1 located at the input side of the clutch 3, as seen in FIG. 3, the motor/generator 1 may be located upstream of the engine 2. Alternatively, as seen in FIG. 4, the motor/generator 1 may be located downstream of the engine 2. In the powertrain layout shown in FIG. 3, the output shaft of the engine 2 is connected directly to the input shaft of the clutch 3, so that the engine output shaft and the clutch input shaft are constructed as one integral shaft. The output shaft (the integral shaft) of the engine 2 is connected to the output shaft of the motor/generator 1 by means of a cogged belt and toothed wheels. In the powertrain layout shown in FIG. 4, the output shaft of the engine 2 is connected directly to the input shaft of the clutch 3, penetrating the rotor of the motor/generator 1. In this manner, the input shaft of the clutch 3 is constructed by the sole integral shaft. On the other hand, as regards the powertrain layout between the CVT 5 and the motor/generator 4 located at the output side of the clutch 3, as seen in FIG. 3, the motor/generator 4 may be located upstream of the CVT 5. Alternatively, as seen in FIG. 4, the motor/generator 4 may be located downstream of the CVT 5. In the powertrain layout shown in FIG. 3, the output shaft of the clutch 3 is connected directly to the input shaft of the CVT 5, penetrating the rotor of the motor/generator 4, so that the clutch output shaft and the motor shaft of the motor/generator 4 are constructed as one integral shaft. In the powertrain layout shown in FIG. 4, the output shaft of the clutch 3 is connected directly to the output shaft of the motor/generator 4, penetrating the input shaft of the CVT 5. In this manner, the output side of the clutch 3 is constructed by the sole integral shaft. In either the powertrain layout shown in FIG. 3 or the powertrain layout shown in FIG. 4, the motor shaft of the motor/generator 4 is connected to the input shaft of the CVT 5. It will be easily understood that the powertrain layout is not limited to the particular embodiments shown in FIGS. 3 and 4. The embodied powertrain layout (or the embodied propulsion mechanism) may be replaced by any modifications satisfying a fundamental concept where the crankshaft of the engine 2 and the motor shaft of the motor/generator 1 are connected to the input shaft of the clutch 3, the motor shaft of the motor/generator 4 and the input shaft of the CVT 5 are connected to the output shaft of the clutch 3, and thus power (driving torque) is transmitted from the output shaft of the CVT 5 through the reduction gear 6 and the differential 7 to the drive wheels 8. FIG. 5 shows another example of a powertrain layout applicable to the hybrid vehicle of the invention. The powertrain layout shown in FIG. 5 is somewhat different from the powertrain layout shown in FIG. 3, in that the segmented steel belt type CVT is replaced with a toroidal CVT. In the same manner as the powertrain layout shown in FIGS. 3 and 4, in case of the powertrain layout equipped with the toroidal CVT shown in FIG. 5, either one of the motor/generator 4 and the toroidal CVT 5 may be located close to the output shaft of the clutch 3. Anyway, the motor shaft of the motor/generator 4 must be connected to the input shaft of the CVT 5.

Figure 6:
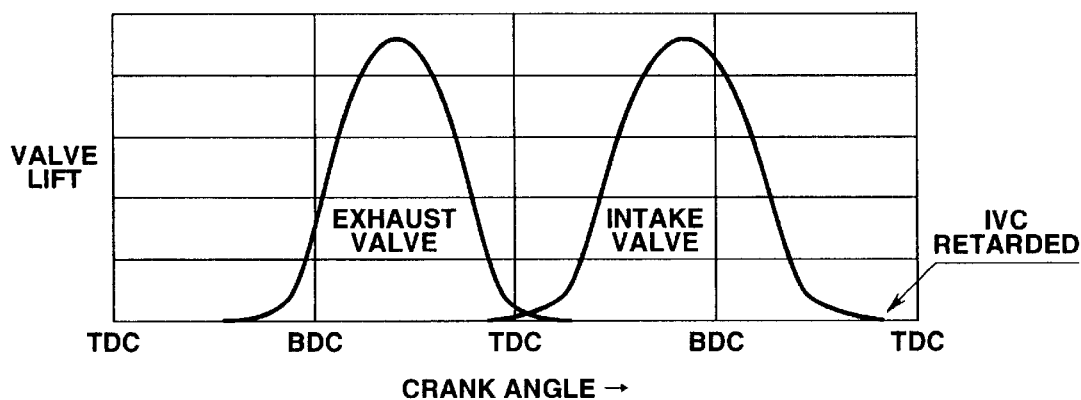
FIG. 6 shows valve timing characteristics illustrating both the relationship between an exhaust-valve lift and a crank angle and the relationship between an intake-valve lift and the crank angle, during driving of the vehicle propelled by an electric motor after engine warm-up, while the engine is not started and the clutch is disengaged (with IVC retarded).
Figure 7:
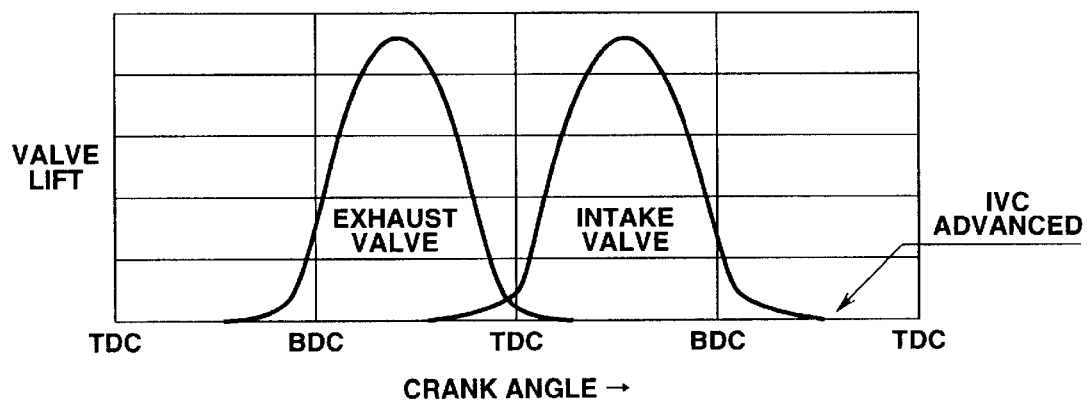
FIG. 7 shows valve timing characteristics illustrating both the relationship between an exhaust-valve lift and a crank angle and the relationship between an intake-valve lift and the crank angle, during driving of the vehicle propelled by an internal combustion engine after engine warm-up, while the clutch is engaged (with IVC advanced).

Hereunder described in detail is an intake-valve close timing (IVC) control executed by the control unit 16 employed in the parallel hybrid system of the hybrid vehicle of the embodiment. During the vehicle standstill after engine warm-up, the control unit 16 operates to disengage the clutch 3 and to execute a so-called idling stop where the engine 2 is stopped. When the vehicle starts after the engine warm-up, the hybrid vehicle is propelled by a driving torque generated by the motor/generator 4, while the clutch 3 remains disengaged. Then, after the engine 2 is started up by means of the motor/generator 1, the clutch 3 is engaged. In the warmed-up state of the engine 2, before the clutch 3 is engaged, as seen in FIG. 6, the intake-valve closing point (IVC) is controlled or adjusted to a retarded valve closure timing, as compared to an intake-valve closing point set in a state where the clutch 3 is engaged. At such a retarded valve closure timing (at a retarded IVC), the engine 2 is started up. Conversely, after the clutch 3 is engaged, as seen in FIG. 7, the intake-valve closing point (IVC) is controlled or adjusted to a predetermined advanced valve closure timing, as compared to an intake-valve closing point set in a state where the clutch 3 is disengaged.

Figure 8:
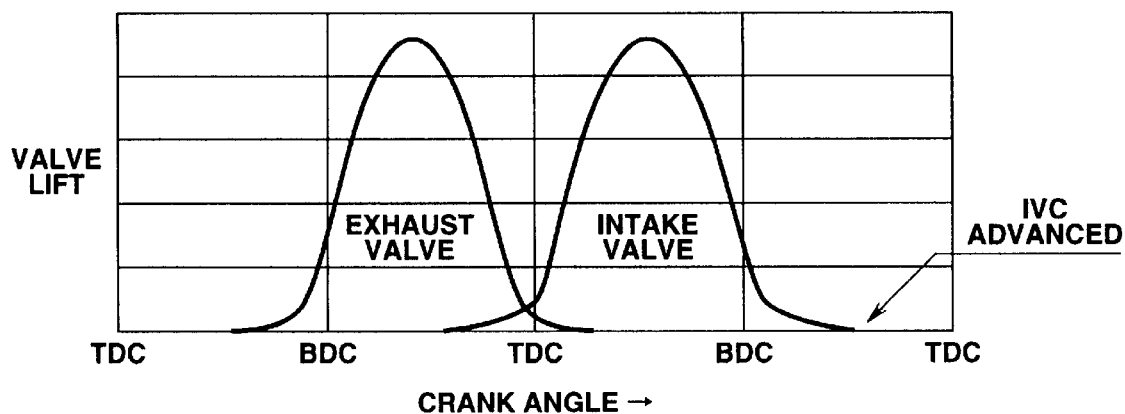
FIG. 8 shows valve timing characteristics illustrating both the relationship between an exhaust-valve lift and a crank angle and the relationship between an intake-valve lift and the crank angle, during driving of the vehicle propelled by the engine plus motor or by the motor after engine warm-up, while the clutch is engaged or disengaged (with IVC advanced).
Figure 9:
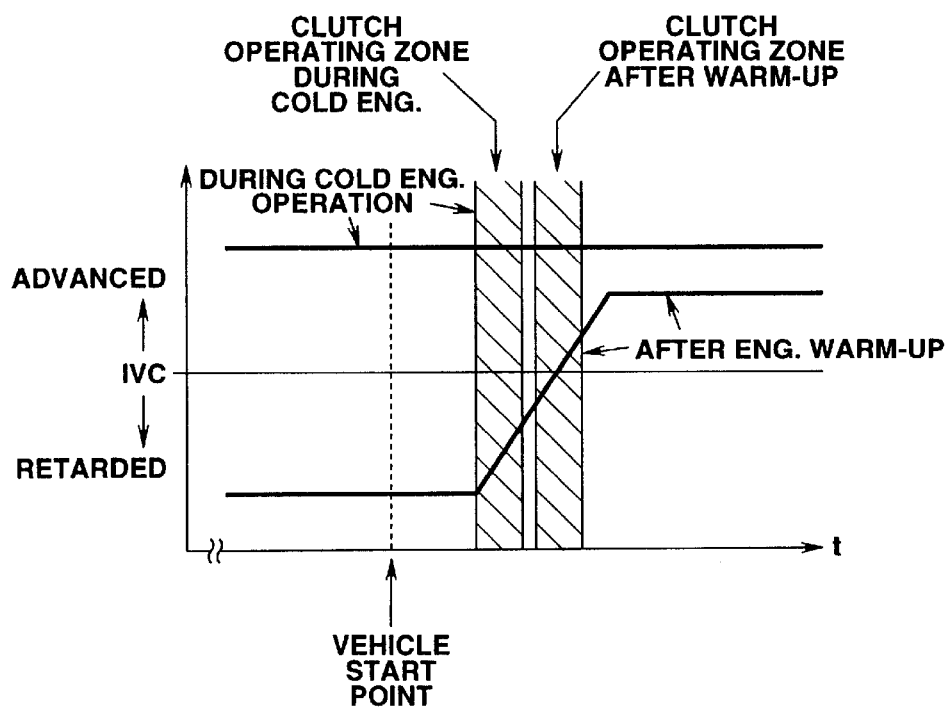
FIG. 9 is a timing chart illustrating both variations in the intake valve close timing (IVC) after engine warm-up and the IVC fixed to a predetermined constant value during cold engine operation, and explaining an IVC control executable by the hybrid system of the embodiment.

On the other hand, during the vehicle standstill and during the cold engine operation, the control unit 16 operates to disengage the clutch 3 and to permit the ignition system 31 to continue to run the engine 2 while igniting air-fuel mixture, such that the "idling stop" operation is not executed. During the cold engine operation, when the hybrid vehicle starts, the vehicle can be started by both the driving torque generated by the engine 2 and the driving torque generated by the motor/generator 4, while maintaining the clutch 3 in its partly-engaged state (or a half-engaged state). As seen in FIG. 8, during the cold engine operation, the retardation control for the IVC is not executed, that is, the intake-valve closing point (IVC) is controlled or adjusted to a predetermined advanced valve closure timing, irrespective of engagement or disengagement of the clutch 3. FIG. 9 is a characteristic map of the IVC control of the embodiment. In FIG. 9, the left-hand clutch operating zone corresponds to a clutch operating zone suitable for the cold engine operating period, whereas the right-hand clutch operating zone corresponds to a clutch operating zone suitable for the warmed-up engine operating period. As can be appreciated from the upper horizontal solid line shown in FIG. 9, during the cold engine operation, the IVC is fixed to the predetermined constant value (i.e., the predetermined advanced valve closure timing), irrespective of whether the clutch 3 is engaged or disengaged. On the contrary, after the engine warm-up (during the warmed-up engine), the IVC is, first of all, set at a preprogrammed retarded position (i.e., a predetermined retarded valve closure timing), and then the control unit operates to start up the engine 2. After the engine 2 is started up by means of the motor/generator 1, the IVC is gradually adjusted to a direction of advancement of the intake-valve closing, while engaging the clutch 3.

Hereinbelow explained in detail are various effects obtained by the IVC control executed after the engine warm-up (during the warmed-up engine).

(i) The negative pressure in the intake manifold does not develop sufficiently, just after the engine is started up. Thus, if the clutch is engaged just after the engine startup, there is a greatly-increased tendency for comparatively great torque fluctuations to be transmitted to the drive wheels. This results in powertrain vibrations or powertrain shock in the longitudinal directions of the vehicle, thus creating undesired longitudinal G. As a consequence, the undesired longitudinal G gives the vehicle occupants a rough ride. To the contrary, according to the IVC control of the embodiment, the engine 2 can be started up at the predetermined retarded valve closure timing (the preprogrammed IVC retarded position), and then the clutch 3 is engaged. Therefore, even when the negative pressure in the intake manifold does not develop just after the engine startup, there is a tendency for the intake-air flow rate of the engine to reduce. The reduced intake-air flow rate contributes to reduction of torque fluctuations in engine torque output. Thus, with the IVC retarded, even when the clutch is engaged as soon as the engine is started up, there is less torque fluctuations transmitted to the drive wheels. That is, according to the IVC control of the embodiment, the undesired longitudinal G, occurring when the clutch is engaged, can be suppressed, thus assuring a good ride. The less torque fluctuations occurring when the clutch is engaged, may reduce the undesirable clutch wear produced due to slippage of the clutch.

Figure 10:
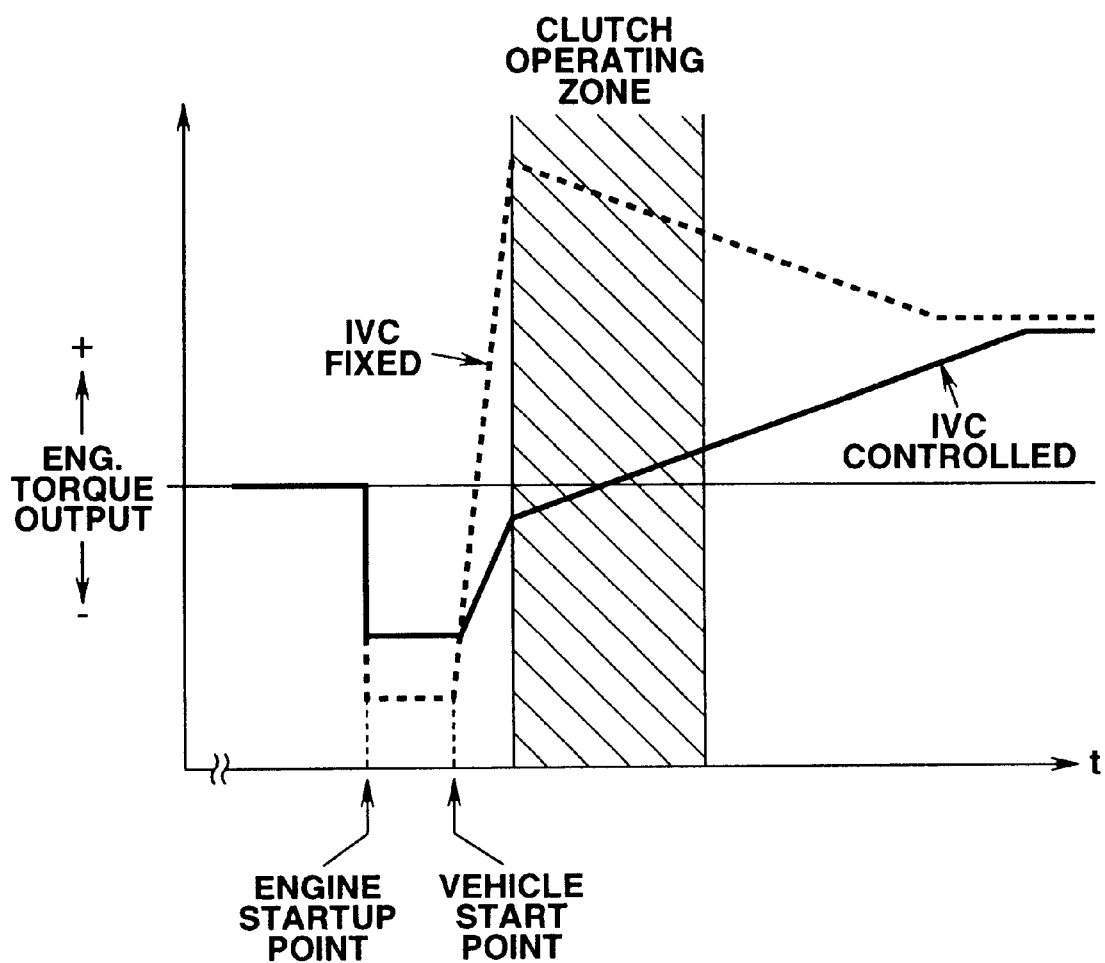
FIG. 10 is a timing chart illustrating the difference between the change in engine torque output based on the IVC control of the embodiment and the change in engine torque output without any IVC control (with the IVC fixed), after and before the engine startup (or the vehicle starts).

(ii) The combustion velocity as well as the actual compression ratio can be lowered by starting up the engine 2 at the retarded IVC point, and thus the engine torque output can be moderately risen up. As a result of this, the hybrid vehicle can start smoothly. FIG. 10 shows timing charts illustrating the engine torque output characteristics obtained after and before the engine startup, in case of the IVC fixed (see the broken line of FIG. 10) to a predetermined advanced valve closure timing, and in case of the IVC controlled (see the solid line of FIG. 10) or adjusted from the predetermined retarded valve closure timing to a predetermined advanced valve closure timing. The engine 2 is driven by means of the motor/generator 1 during the engine startup, and thus the torque output generated by the engine itself becomes negative. As seen from the broken line of FIG. 10, when the engine 2 is started up with the IVC fixed to the predetermined advanced valve closure timing, there is a rapid torque rise just after the engine startup. Thereafter, as the negative pressure in the intake manifold develops, the engine torque output tends to drop gradually. As seen from the solid line of FIG. 10, when the engine 2 is started up with the IVC controlled from the predetermined retarded valve closure timing to a predetermined advanced valve closure timing according to the IVC control of the embodiment, there is a comparatively less torque rise in the engine torque output owing to the lower actual compression ratio and the lower combustion speed obtained just after the engine startup. Thereafter, as the IVC is gradually advanced, the engine torque output tends to increase gradually. As a consequence, the control unit of the embodiment permits the engine torque output to moderately rise. Such a moderate torque rise minimizes powertrain shock or powertrain vibrations during the vehicle starting period, thus insuring smooth vehicle start.

(iii) According to the IVC control of the embodiment, it is possible to increase the actual compression ratio as well as the intake-air flow rate of the engine 2 by gradually advancing the IVC, while engaging the clutch 3, and by setting the IVC at the predetermined advanced valve closure timing after the clutch is engaged. Therefore, the parallel hybrid system, capable of executing the previously-noted IVC control, ensures good combustion and an increased engine torque output required when accelerating.

Figure 11:
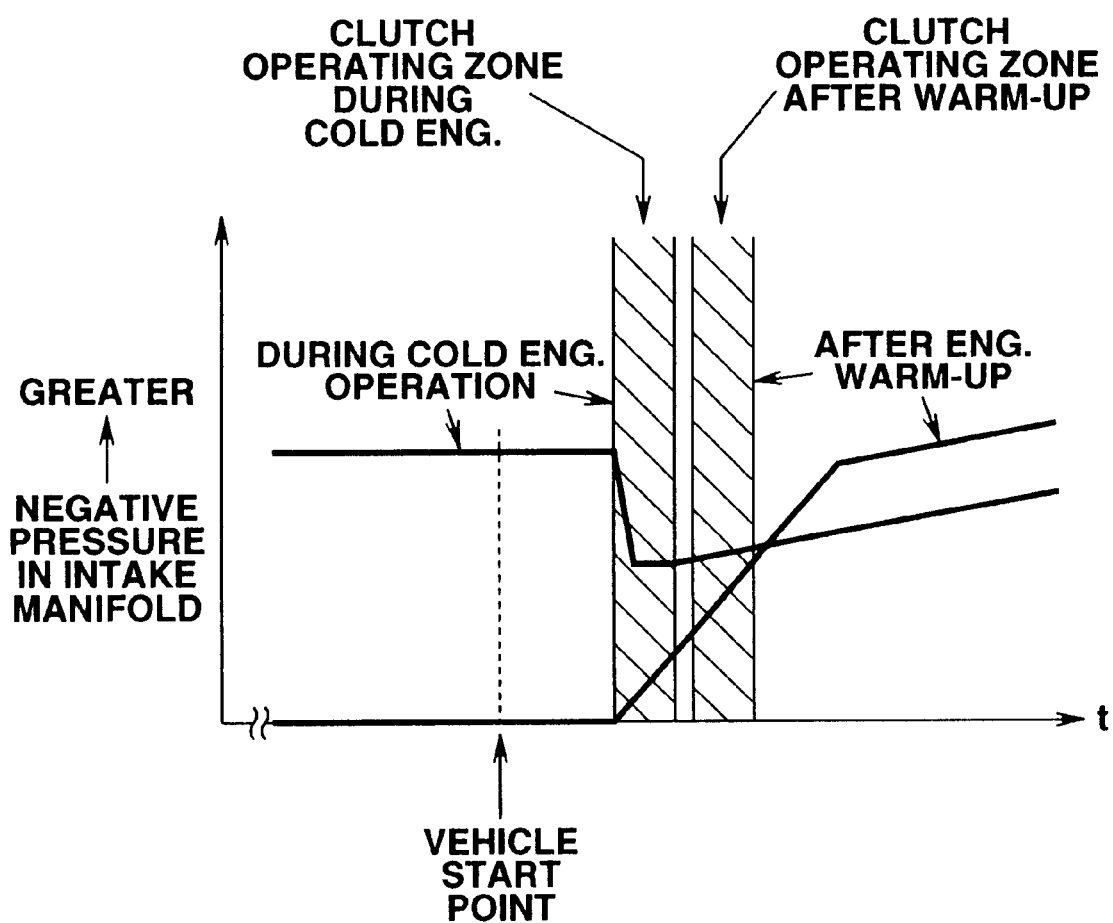
FIG. 11 is a timing chart illustrating the difference between the change in negative manifold pressure obtained during cold engine operation and the change in negative manifold pressure obtained after engine warm-up, before and after the vehicle starts.
Figure 12:
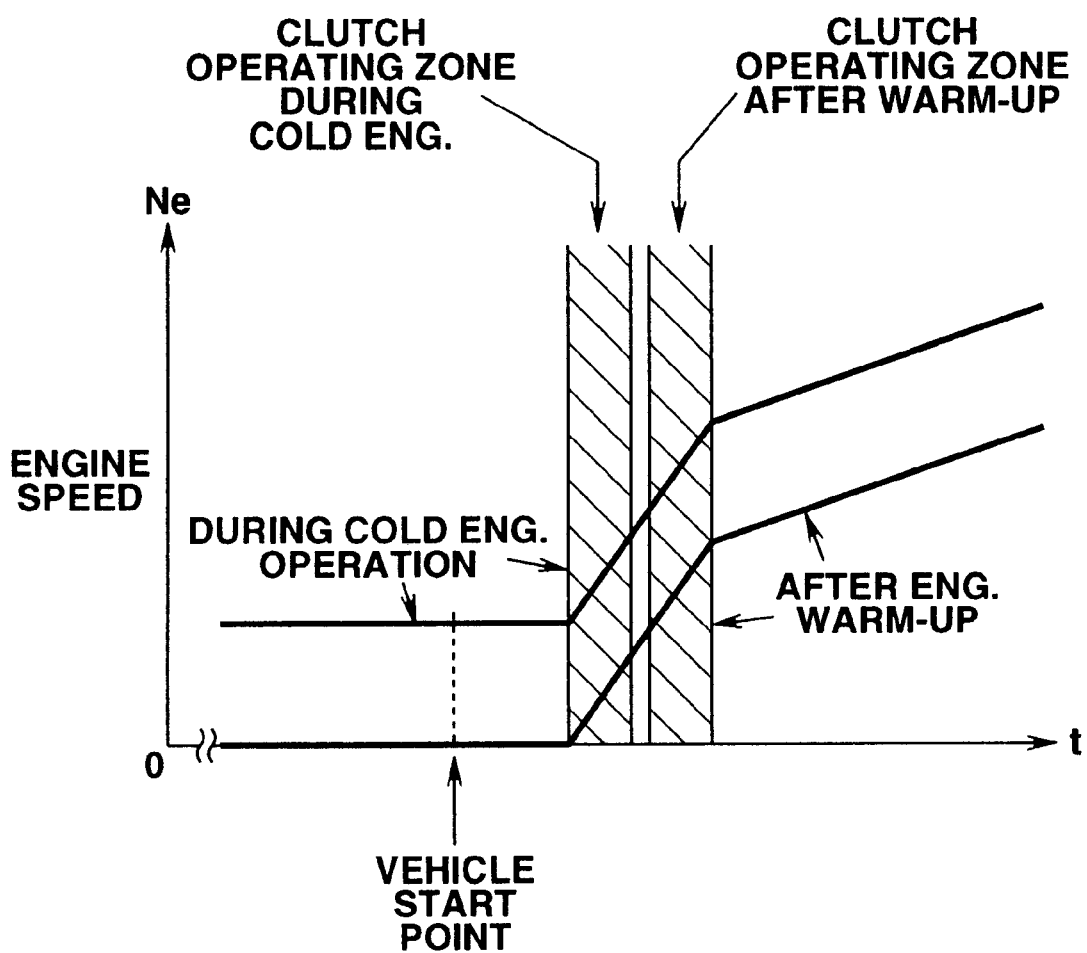
FIG. 12 is a timing chart illustrating the difference between the change in engine speed obtained during cold engine operation and the change in engine speed after engine warm-up, before and after the vehicle starts.

FIG. 11 shows the change in negative pressure in the intake manifold obtained during cold engine operation and the change in the intake manifold obtained after engine warm-up, before and after the vehicle starts. On the other hand, FIG. 12 shows the change in engine speed obtained during the cold engine operation and the change in engine speed obtained after the engine warm-up, before and after the vehicle starts. In FIGS. 11 and 12, the left-hand clutch operating zone (the left-hand hatched zone) corresponds to a clutch operating zone suitable for the cold engine operating period, whereas the right-hand clutch operating zone (the right-hand hatched zone) corresponds to a clutch operating zone suitable for the warmed-up engine operating period. During engagement of the clutch 3, the negative pressure in the intake manifold is developing. In such a case, if the advancement of the IVC is not executed, the intake-air flow rate of the engine cannot be increased. As a result, a timing of engine-speed rise may be delayed, and whereby there is an increased tendency of engine stalling during engagement of the clutch. According to the IVC control of the embodiment, the clutch can be engaged, while advancing the IVC, thus effectively increasing both the intake-air flow rate of the engine and the actual compression ratio. This ensures a rapid rise in the engine speed Ne and a rapid rise in the engine torque Te.

Hereunder described in detail is the reason for controlling or fixing the IVC to the predetermined advanced valve closure timing during the cold engine operation, regardless of engagement or disengagement of the clutch.

As is generally known, during the cold engine operation, a compression temperature (i.e., a combustion temperature) of the engine 2 is low. In this case, if the IVC is retarded, there is an increased tendency for combustion of the engine to deteriorate. Additionally, friction loss in the engine or the vehicle is great during the cold engine operation, and thus a comparatively great engine torque output is required. For the reasons set out above, the IVC must be controlled or set to the preprogrammed advanced valve closure timing from before the clutch is engaged, in order to produce the engine torque output enough to attain the required power (or the required driving torque). During the cold engine operation, even when the vehicle is conditioned in the standstill state, the ignition system continues to run the engine 2, while igniting the air-fuel mixture, and thus the negative pressure in the intake manifold develops sufficiently. Also, the intake-air flow rate itself is small during engagement of the clutch. Thus, torque fluctuations transmitted to the drive wheels 8 tends to be remarkably less in comparison with the warmed-up engine.

Figure 13:
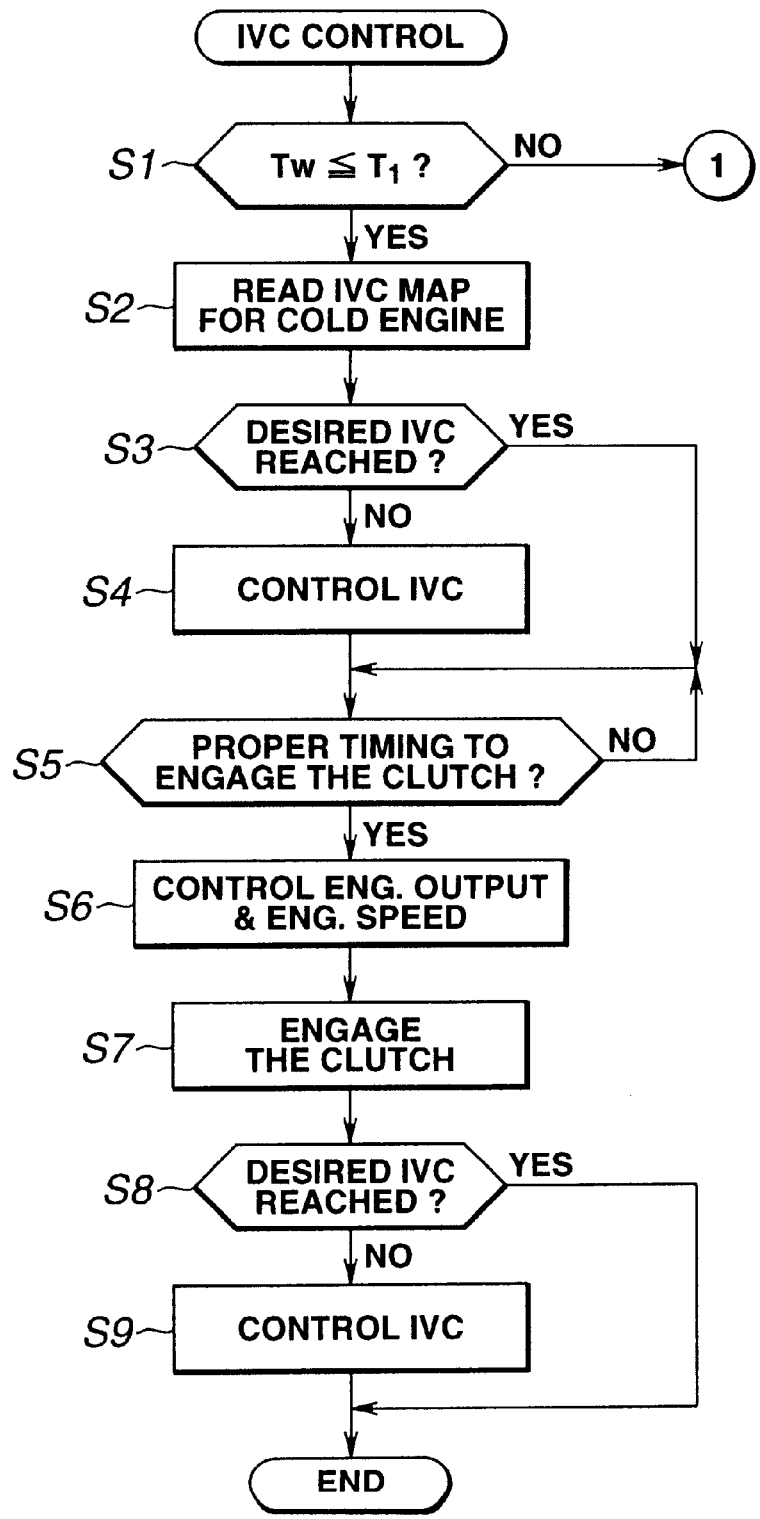
FIGS. 13 and 14 are flow charts illustrating the IVC control of the embodiment.
Figure 14:
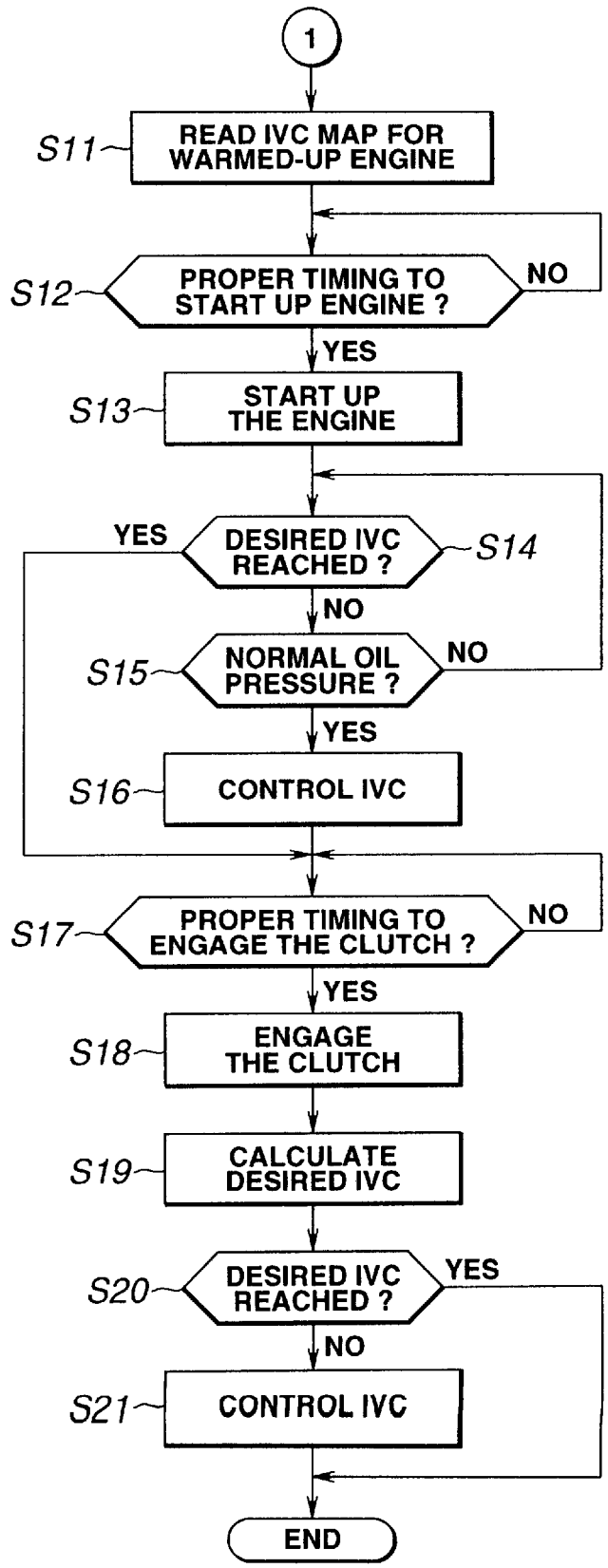

Referring now to FIGS. 13 and 14, there is shown a series of control procedures of the IVC control of the embodiment. The IVC control routine of the embodiment is hereinbelow explained in accordance with the flow charts shown in FIGS. 13 and 14. The IVC control routine shown in FIGS. 13 and 14 is executed as time-triggered interrupt routines to be triggered every predetermined sampling time intervals.

The control unit 16 begins to execute the IVC control routine, when the select lever is positioned at D or R, that is, when the driver selected range is the D range or the R range. In step S1, a test is made to determine whether the engine coolant temperature Tw detected by the coolant temperature sensor 35 is below a predetermined temperature value T1. When the inequality Tw≦T1 is satisfied, the control unit 16 determines that the engine 2 is conditioned in its cold state. Therefore, in case of Tw≦T1, a first series of IVC control procedures shown in steps S2 through S9, suitable for the cold-engine period, are executed. Conversely, when the coolant temperature Tw exceeds the predetermined temperature value T1, that is, in case of Tw>T1, the control unit 16 determines that the engine 2 is conditioned in its warmed-up state. Thus, a second series of IVC control procedures shown in steps S11 through S21 (see FIG. 14), suitable for the warmed-up engine, are executed. In the IVC control executed during the cold engine operation, first of all, in step S2, a preprogrammed IVC map, suitable for the cold-engine period, is read. The IVC map suitable for the cold-engine period is preset or preprogrammed on the basis of both the engine speed Ne and the engine torque Te of the engine 2, and stored in a memory (ROM) incorporated in the control unit 16. In the shown embodiment, as appreciated from the upper horizontal solid line shown in FIG. 9, the IVC is constantly fixed to the predetermined constant value (the predetermined advanced valve closure timing) without any retarding operation during the old engine operation, and thus the preprogrammed IVC map suitable for the cold-engine operation is omitted. In step S3, a test is made to determine whether a desired IVC is reached, on the basis of the IVC detected by the IVC sensor 37. When there is a deviation of the detected IVC from the desired IVC, that is, when the answer to step S3 is in the negative (NO), step S4 occurs. In step S4, the actual IVC detected by the IVC sensor is adjusted to the desired IVC by controlling the variable valve timing control system 32. Thereafter, in step S5, a test is made to determine whether the present time (the current sampling time) corresponds to a proper timing to engage the clutch 3, by reference to a preprogrammed map based on the vehicle speed V and the accelerator opening θ (or an accelerator operating amount APS of the accelerator pedal). When the answer to step S5 is in the negative (NO), the procedure returns to step S5. When the answer to step S3 is affirmative (YES), the procedure jumps from step S3 to step S5. When the answer to step S5 is in the affirmative (YES), that is, when the control unit 16 determines that the current sampling time corresponds to the proper timing to engage the clutch, the procedure flows through steps S6 and S7 to step S8. In steps S6 and S7, the clutch 3 is engaged while adjusting both the engine speed Ne and the engine torque output Te of the engine 2. In step S8, a test is made to determine whether a desired IVC is reached, on the basis of the latest up-to-date input information indicative of the IVC detected by the IVC sensor 37. When the latest IVC data is deviated from the desired IVC, step S9 proceeds. In step S9, in the same manner as step S4, the IVC is adjusted to the desired IVC by controlling the variable valve timing control system 32. When the control unit determines that the desired IVC is reached through step S8, one cycle of the IVC control routine terminates.

Figure 15:
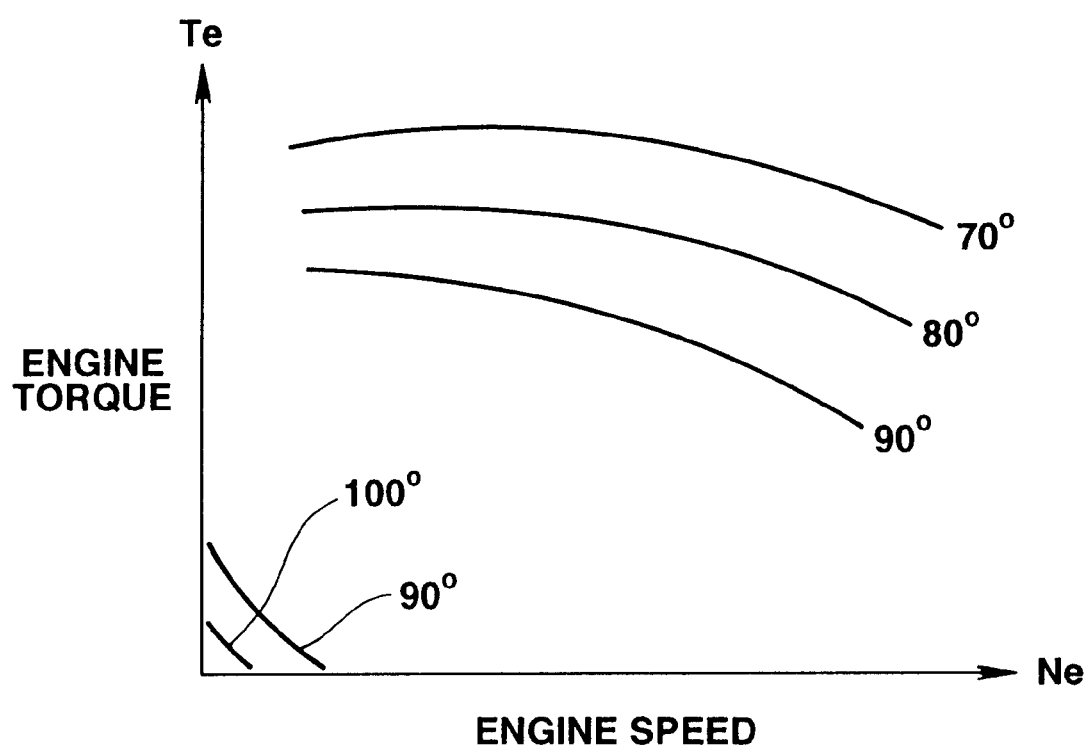
FIG. 15 is a preprogrammed IVC map (related to step S11 of FIG. 14) illustrating the relationship among engine speed (Ne), engine torque output (Te), and an intake valve close timing (IVC) used for the warmed-up engine.

In case of the second series of IVC control procedures executed after the engine warm-up, in step S11, a preprogrammed IVC map, suitable for the warmed-up engine period, is read. FIG. 15 shows an example of the preprogrammed IVC map suitable for the engine warm-up period and based on both the engine speed Ne and the engine torque Te. In step S12, a check is made to determine whether the present time (the current sampling time) corresponds o a proper timing to start up the engine 2, by reference to a preprogrammed map based on the vehicle speed V and the accelerator opening θ (or an accelerator operating amount APS of the accelerator pedal). When the answer to step S12 is negative (NO), the procedure returns again to step S12. When the answer to step S12 is affirmative (YES), step S13 occurs. In step S13, the engine 2 is driven and started up by means of the motor/generator 1. Then, in step S14, a test is made to determine whether a desired IVC is reached, on the basis of the latest up-to-date input information indicative of the IVC detected by the IVC sensor 37. When the desired IVC is reached, the procedure jumps from step S14 to step S17. Conversely, when the latest IVC data is deviated from the desired IVC, step S15 occurs. In step S15, a check is made to determine whether the engine oil pressure Pe detected by the oil pressure sensor 36 rises up to the predetermined oil pressure level. When the detected engine oil pressure Pe is above the predetermined normal oil pressure level, step S16 occurs. To the contrary, when the detected oil pressure Pe is insufficient and does not reach the predetermined oil pressure level, the procedure returns to step S14. In step S16, the IVC is adjusted to the desired IVC by controlling the variable valve timing control system 32. In step S17, in the same manner as step S5, a test is made to determine whether the present time (the current sampling time) corresponds to a proper timing to engage the clutch 3, by reference to a preprogrammed map based on the vehicle speed V and the accelerator opening θ (or an accelerator operating amount APS of the accelerator pedal). When the answer to step S17 is negative (NO), the procedure returns to step S17. When the answer to step S17 is affirmative (YES), that is, when the control unit 16 determines that the current sampling time corresponds to the proper timing to engage the clutch, the procedure advances from step S17 to step S18. In step S18, the clutch 3 is engaged. Thereafter, in step S19, a desired IVC is retrieved from the preprogrammed IVC map (see FIG. 15) on the basis of both the engine speed Ne and the engine torque output Te. In step S20, a test is made to determine whether a desired IVC is reached, on the basis of the latest up-to-date input information indicative of the IVC detected by the IVC sensor 37. When the answer to step S20 is negative (NO), that is, in the presence of a deviation of the detected IVC from the desired IVC, step S21 occurs. In step S21, the IVC is adjusted to the desired IVC by controlling the variable valve timing control system 32. Conversely, when the answer to step S20 is affirmative (YES), that is, in the absence of a deviation from the desired IVC, one cycle of the IVC control routine ends.

The entire contents of Japanese Patent Application P10-72388 (filed Mar. 20, 1998) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A hybrid vehicle employing a parallel hybrid system, using both an internal combustion engine and an electric motor for propulsion, said hybrid vehicle comprising:
   a propulsion mechanism having at least a first electric motor, an internal combustion engine, a clutch, a second electric motor, a transmission, and drive wheels, and constructed so that a crankshaft of the engine and a motor shaft of the first electric motor are connected to an input shaft of the clutch, and that a motor shaft of the second electric motor and an input shaft of the transmission are connected to an output shaft of the clutch to transmit a driving torque from the output shaft of the transmission to the drive wheels;

an engine temperature sensor for detecting an engine temperature of the engine;

a control unit being configured to be electrically connected to said propulsion mechanism and said engine temperature sensor, for disengaging the clutch and stopping the engine during a standstill state of the hybrid vehicle, and for propelling the hybrid vehicle by a driving torque generated by the second electric motor when the hybrid vehicle starts, and for starting up the engine by the first electric motor and engaging the clutch after engine startup, under a first specified engine-temperature condition where the engine temperature is above a predetermined temperature value; and a variable valve timing control system mounted on an intake valve of the internal combustion engine and electrically connected to said control unit for adjusting an intake-valve closure timing to a predetermined retarded closure timing when the clutch is disengaged and for adjusting the intake-valve closure timing to a predetermined advanced closure timing after the clutch is engaged, under the first specified engine-temperature condition.

2. The hybrid vehicle as claimed in claim 1, wherein said variable valve timing control system sets the intake-valve closure timing at the predetermined retarded closure timing before the engine is started up and gradually adjusts the intake-valve closure timing to a direction of timing advancement when the clutch is engaged after engine startup, under the first specified engine-temperature condition.

3. The hybrid vehicle as claimed in claim 1, wherein the engine has an electronic ignition system, and said control unit is configured to be electrically connected to said propulsion mechanism, said engine temperature sensor, and said electronic ignition system, for disengaging the clutch and continuing to run the engine while igniting air-fuel mixture during the standstill state of the hybrid vehicle, and for starting the hybrid vehicle by both a driving torque generated by the engine and the driving torque generated by the second electric motor with the clutch held in a half-engaged state when the hybrid vehicle starts, under a second specified engine-temperature condition where the engine temperature is below the predetermined temperature value, and wherein said variable valve timing control system adjusts the intake-valve closure timing to a predetermined advanced closure timing irrespective of whether the clutch is engaged or disengaged, under the second specified engine-temperature condition.

4. An electronic driving torque control system for a hybrid vehicle employing a parallel hybrid system, using both an internal combustion engine and an electric motor for propulsion, the internal combustion engine having a variable valve timing control system mounted on at least an intake valve for variably adjusting an intake-valve closure timing and an electronic ignition system, said electronic driving torque control system comprising:

a propulsion means having at least a first electric motor, an internal combustion engine, a clutch, a second electric motor, a transmission, and drive wheels, and constructed so that a crankshaft of the engine and a motor shaft of the first electric motor are connected to an input shaft of the clutch, and that a motor shaft of the second electric motor and an input shaft of the transmission are connected to an output shaft of the clutch to transmit a driving torque from the output shaft of the transmission to the drive wheels;

an engine temperature sensor for detecting an engine temperature of the engine;

a propulsion control means connected to said propulsion means and said engine temperature sensor, for disengaging the clutch and stopping the engine during a standstill state of the hybrid vehicle, and for propelling the hybrid vehicle by a driving torque generated by the second electric motor when the hybrid vehicle starts, and for starting up the engine by the first electric motor and engaging the clutch after engine startup, under a first specified engine-temperature condition where the engine temperature is above a predetermined temperature value; and an intake-valve closure timing control means connected to said variable valve timing control system for controlling an intake-valve closure timing to a predetermined retarded closure timing when the clutch is disengaged and for controlling the intake-valve closure timing to a predetermined advanced closure timing after the clutch is engaged, under the first specified engine-temperature condition.

5. The electronic driving torque control system as claimed in claim 4, wherein said intake-valve closure timing control means sets the intake-valve closure timing at the predetermined retarded closure timing before the engine is started up and gradually controls the intake-valve closure timing to a direction of timing advancement when the clutch is engaged after engine startup, under the first specified engine-temperature condition.

6. The electronic driving torque control system as claimed in claim 4, wherein said propulsion control means is configured to be electrically connected to said propulsion means, said engine temperature sensor, and said electronic ignition system, for disengaging the clutch and continuing to run the engine while igniting air-fuel mixture during the standstill state of the hybrid vehicle, and for starting the hybrid vehicle by both a driving torque generated by the engine and the driving torque generated by the second electric motor with the clutch held in a half-engaged state when the hybrid vehicle starts, under a second specified engine-temperature condition where the engine temperature is below the predetermined temperature value, and wherein said intake-valve closure timing control means controls the intake-valve closure timing to a predetermined advanced closure timing irrespective of whether the clutch is engaged or disengaged, under the second specified engine-temperature condition.

* * * * *